(12) United States Patent
Devoe et al.

(10) Patent No.: US 6,974,516 B2
(45) Date of Patent: *Dec. 13, 2005

(54) METHOD OF MAKING LAMINATE THIN-WALL CERAMIC TUBES AND SAID TUBES WITH ELECTRODES, PARTICULARLY FOR SOLID OXIDE FUEL CELLS

(75) Inventors: Alan Devoe, La Jolla, CA (US); Mary Trinh, San Diego, CA (US)

(73) Assignee: Presidio Components, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/784,445

(22) Filed: Feb. 23, 2004

(65) Prior Publication Data

US 2005/0000621 A1    Jan. 6, 2005

Related U.S. Application Data

(63) Continuation-in-part of application No. 09/828,558, filed on Apr. 5, 2001, now Pat. No. 6,695,940.

(51) Int. Cl.[7] .......................... C03B 29/00; H01M 8/00
(52) U.S. Cl. ............................ 156/89.16; 156/89.11; 156/89.12; 156/89.23; 156/184; 156/190; 156/192; 156/195; 264/618; 264/635; 429/31
(58) Field of Search .................... 156/89.11, 89.12, 156/89.16, 184, 190, 191, 192, 195, 188, 156/89.23; 264/610, 618, 635; 429/30, 31

(56) References Cited

U.S. PATENT DOCUMENTS 4,276,331 A * 6/1981 Bothwell .................. 428/34.6

(Continued)

FOREIGN PATENT DOCUMENTS

DE       2325338      * 12/1973

(Continued)

OTHER PUBLICATIONS

Henrik Raeder, *Fabrication of thin-walled ceramic tubes by tape casting*, Ceramics Today-Tomorrow's Ceramics, Elsevier Science Publishers, 1991, p. 1123-1129.

(Continued)

*Primary Examiner*—Melvin Mayes
(74) *Attorney, Agent, or Firm*—Wood, Herron & Evans, LLP

(57) ABSTRACT

A method of fabricating a ceramic tube with electrodes thereon suitable for use as a tubular reaction chamber for a fuel cell. In one embodiment, the method includes wrapping a first electrode material around a mandrel, then wrapping a green ceramic material over the first electrode material, and then wrapping a second electrode material over the green ceramic material. The wrapped layers are laminated together, and then removed from the mandrel and sintered, in either sequence, to produce the laminated ceramic tube having an inner first electrode and an outer second electrode. Alternatively, a first electrode tube is provided in place of the mandrel and around which the green ceramic material is wrapped. The outer second electrode may be produced by wrapping a second electrode material around the green ceramic material, before or after laminating, or by printing the electrode material onto the sintered ceramic tube. The present invention further provides a method of making a ceramic tube in which a sacrificial organic material is first wrapped around the mandrel to a desired thickness prior to wrapping the green ceramic material to increase the green material thickness. During sintering, the organic material is burned away leaving only a laminated ceramic tube, optionally with electrodes thereon.

30 Claims, 2 Drawing Sheets

U.S. PATENT DOCUMENTS

| | | | |
|---|---|---|---|
| 4,348,714 A | 9/1982 | Wallace | 361/328 |
| 4,395,231 A | 7/1983 | Sands et al. | 432/11 |
| 4,475,967 A | 10/1984 | Kanai et al. | 156/89 |
| 4,562,124 A | 12/1985 | Ruka | 429/30 |
| 4,579,707 A | 4/1986 | Kobayashi et al. | 264/209.1 |
| 4,770,631 A | 9/1988 | Hell et al. | 432/258 |
| 4,985,103 A | 1/1991 | Kouno et al. | 156/184 |
| 5,108,850 A | 4/1992 | Carlson et al. | 429/31 |
| 5,151,660 A | 9/1992 | Powers et al. | 324/689 |
| 5,227,105 A | 7/1993 | Eucker et al. | 264/57 |
| 5,277,995 A | 1/1994 | Ruka et al. | 429/31 |
| 5,779,969 A | 7/1998 | Chatterjee et al. | 264/619 |
| 5,827,620 A * | 10/1998 | Kendall | 429/31 |
| 5,935,513 A | 8/1999 | Martreuil et al. | 264/608 |
| 5,993,985 A * | 11/1999 | Borglum | 429/31 |
| 6,692,855 B1 * | 2/2004 | Aizawa et al. | 429/30 |
| 6,695,940 B2 | 2/2004 | Devoe et al. | 156/89.11 |

FOREIGN PATENT DOCUMENTS

| | | | |
|---|---|---|---|
| JP | 62-292646 | 12/1987 | C03B 32/00 |
| JP | 62-292686 * | 12/1987 | |
| JP | 64-025583 | 1/1989 | H01L 41/22 |
| JP | 2-8008 * | 1/1990 | |
| JP | 3233915 | 10/1991 | |
| JP | 7226317 | 8/1995 | H01F 41/04 |
| SU | 887175 * | 12/1981 | H01F 6/06 |

OTHER PUBLICATIONS

*Improved construction of bender element*, IBM Technical Disclosure Bulletin, Jun. 1986, vol. 29, p. 28-31.

* cited by examiner

METHOD OF MAKING LAMINATE THIN-WALL CERAMIC TUBES AND SAID TUBES WITH ELECTRODES, PARTICULARLY FOR SOLID OXIDE FUEL CELLS

CROSS REFERENCE TO RELATED APPLICATION

This application is a continuation-in-part of U.S. patent application Ser. No. 09/828,558 filed Apr. 5, 2001 now U.S. Pat. No. 6,695,940 and entitled "Laminate Thin-Wall Ceramic Tubes, Including With Integral Stress Wrappings, Thickened Ends and/or Internal Baffles, Particularly For Solid Oxide Fuel Cells," the disclosure of which is incorporated herein by reference in its entirety as if completely set forth herein below.

FIELD OF THE INVENTION

The present invention generally concerns (i) the fabrication of thin-walled ceramic tubes, on the order of 1 millimeter to less than 100 micrometers wall thickness and from 20–100 centimeters in length, by a lamination process; and (ii) the fabrication of thin-wall ceramic tubes with electrodes suitable for use as a tubular reaction chamber in a Solid Oxide Fuel Cell (SOFC).

BACKGROUND OF THE INVENTION

Ceramic tubes have found a use in the manufacture of Solid Oxide Fuel Cells (SOFCs). There are several types of fuel cells, each offering a different mechanism of converting fuel and air to produce electricity without combustion. In SOFCs, the barrier layer (the "electrolyte") between the fuel and the air is a ceramic layer, which allows oxygen atoms to migrate through the layer to complete a chemical reaction. Because ceramic is a poor conductor of oxygen atoms at room temperature, the fuel cell is operated at 700° C. to 1000° C., and the ceramic layer is made as thin as possible.

Early SOFCs were produced by the Westinghouse Corporation using long, fairly large diameter, extruded tubes of zirconia ceramic. Typical tube lengths were several feet long, with tube diameters ranging from ¼ inch to ½ inch. A complete structure for a fuel cell typically contained roughly ten tubes. Over time, researchers and industry groups settled on a formula for the zirconia ceramic which contains 3 mol % $Y_2O_3$. This material is made by, among others, Tosoh of Japan as product TZ-3Y.

Another method of making SOFCs makes use of flat plates of zirconia, stacked together with other anodes and cathodes, to achieve the fuel cell structure. Compared to the tall, narrow devices envisioned by Westinghouse, these flat plate structures can be cube shaped, 6 to 8 inches on an edge, with a clamping mechanism to hold the entire stack together.

A still newer method envisions using larger quantities of small diameter tubes having very thin walls. The use of thin walled ceramic is important in SOFCs because the transfer rate of oxygen ions is limited by distance and temperature; if a thinner layer of zirconia is used then the final device can be operated at a lower temperature while maintaining the same efficiency. Literature describes the need to make ceramic tubes at 150 $\mu$m or less wall thickness. These new thin-wall tubes will be seen to be the subject of the present invention.

Extrusion is the most common method for making ceramic tubes. In this approach, ceramic particles are mixed with an organic binder, often a waxy material, and the material is pressed through a circular opening. The problems with this method include (i) maintaining straightness during the firing process, (ii) obtaining thin walls with no defects, and (iii) preventing sagging of the circular cross-section into an oval shape.

Numerous patents describe methods of improving the manufacture of extruded thin-wall ceramic tubes. Continuous firing in an attempt to create long tubes has been described in U.S. Pat. No. 5,227,105. Sands, et al. describe in U.S. Pat. No. 4,395,231 the rotation of a tubular furnace as the tubular devices are passed through, whereby the speed going into the sintering furnace is faster than the speed coming out of the furnace so as to account for the shrinkage of the ceramic. In U.S. Pat. No. 4,770,631, Hell et al. describe a method of hanging tubes vertically during sintering. In U.S. Pat. No. 5,935,513, Martreuil et al. describe firing a ceramic tube inside of a larger ceramic support tube. Other patents, including U.S. Pat. No. 4,579,707 to Kobayashi et al., describe methods of improving the stiffness of the un-fired tube by using a thermosetting organic binder, and then applying heat immediately after extrusion.

In efforts to make small, thin walled tubes, the extrusion process faces several challenges. One is that the tubes can warp or twist during binder removal. This problem may be due to the fact that the binders commonly used for extrusion do not maintain their strength throughout the binder removal process before sintering. Another problem relates to the production of the thin walls themselves. At a thickness of 150 $\mu$m or less, a fairly small defect, such as an air bubble or a binder inclusion, can cause a defect in the final tube, creating a leak that would be considered catastrophic in a SOFC. Another practical problem with extruding thin walled tubes is that they are mechanically weaker than a thicker tube, which makes mounting difficult.

Henrik Raeder of the Center for Industrial Research in Norway has described the use of tape cast ceramics for making thin walled tubes. Tape casting involves evenly coating a horizontal surface with a ceramic slurry, drying, then removing the dried film. The slurry is prepared by dispersing ceramic in an organic binder, often a mixture of polyvinyl butyryl in solvent. Raeder described using 8 to 20 mm wide strips of tape, and winding them around alumina or glass rods. The wrapped material had an overlap of 1 to 3 mm. The diameter of the rods was 2 to 6 mm. After forming the tubes, they were slipped off the ends of the rods. Except in the areas of the seam, these tube walls were one thickness of cast ceramic, and they had trouble maintaining perfect circular form.

Two methods were used by Raeder to seal the tube along the wrapped seam. One was based on applying ethanol to the seam, which dissolved the binder and made it stick to the next layer. Another method was to apply thinned slurry to the seam, which had the advantage of both sealing the seam and coating it with additional ceramic.

SUMMARY OF THE INVENTION

The present invention provides a ceramic tube with electrodes thereon suitable as a tubular reaction chamber for a fuel cell. In one exemplary embodiment, the method includes wrapping a first electrode material around a mandrel, then wrapping a green ceramic material around the mandrel over the first electrode material, and then wrapping a second electrode material around the mandrel over the green ceramic material, wherein each of the materials are in the form of a sheet or tape. The green ceramic material is wrapped a multiple n times, with each layer having a thickness less than the desired thickness for the ceramic tube. The wrapped layers on the mandrel are laminated together under pressure, and the laminated wraps are removed from the mandrel and sintered, in either sequence, to produce the laminated ceramic tube having an inner first electrode and an outer second electrode. The two electrodes are an anode and a cathode.

In an alternative embodiment of the method of the present invention, rather than wrapping a first electrode material around a mandrel, a first electrode tube is provided in place of the mandrel and around which the green ceramic material is wrapped. The outer second electrode may be produced as in the previous embodiment by wrapping a second electrode material around the green ceramic material, and then laminating the second electrode material and the green ceramic material, followed by sintering. Alternatively, the outer second electrode may be provided by wrapping the second electrode material around the green ceramic material after the ceramic has been laminated, but before sintering. In yet another alternative, the green ceramic material is laminated and sintered first, and then a second electrode material is printed onto the ceramic tube.

The present invention further provides a method of making a ceramic tube in which an organic material is first wrapped around a mandrel to a desired thickness, followed by wrapping the green ceramic material a multiple n times over the organic material, then laminating the wraps while still on the mandrel. In either sequence, the laminated wraps are separated from the mandrel and sintered. During sintering, the organic material is burned away leaving only a laminated ceramic tube. The use of the organic material is particularly useful when the laminated wraps are removed from the mandrel prior to sintering, because the organic material provides additional green thickness and strength to the thin-walled ceramic. Additional organic material may be wrapped over the green ceramic material before laminating or after laminating. After sintering, the first electrode material may be applied to the inner wall of the ceramic tube, and a second electrode material may be applied to the outer wall of the ceramic tube to produce a tubular reaction chamber for a fuel cell. The use of the organic material wrap around the mandrel may also be useful in the above embodiment in which a first electrode material is wrapped around the mandrel. In addition, in any of the embodiments utilizing a mandrel, the method may further include placing a releasing agent on the surface of the mandrel, which upon activation, facilitates separation of the laminated wraps from the mandrel. The present invention further contemplates, in any of the above embodiments, the addition of further wrappings of green ceramic material over end regions of the tube, and not at a central region of the tube, to provide a ceramic tube that is thinner in the middle and thicker at the end regions.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1A:
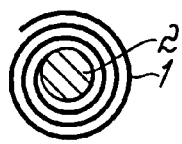
FIG. 1, consisting of FIGS. 1a through 1c, is a diagrammatic perspective view showing the steps of wrapping, laminating, and removing of the mandrel in the thin-wall laminated ceramic tube fabrication method of the present invention.

The present invention contemplates a new process of fabricating thin walled ceramic tubes, particularly as are useful in Solid Oxide Fuel Cells (SOFCs). The thin-wall ceramic tubes are strong during binder removal, straight during and after firing, and of high quality without defects. Three of the laminated thin-walled ceramic tubes may be used in combination as a complete reaction chamber of a fuel cell.

The process of the present invention begins with very thin cast ceramic tape, such as from 10 $\mu$m to 50 $\mu$m, for example approximately 12 $\mu$m in thickness. The tape is wrapped around a mandrel, most commonly made of steel, with enough wraps to reach the desired thickness of a tube wall. To make a ceramic tube of approximate 100 $\mu$m wall thickness, approximately 10 layers of 12 $\mu$m tape are wrapped around the mandrel; the resulting 120 $\mu$m tube will shrink to about 100 $\mu$m wall thickness during sintering. To make this thin-walled ceramic tube approximately 15 cm in length, which is a common length, one can either start with a 15 cm wide ceramic sheet and wrap it directly around the mandrel, or start with a much longer and narrower strip of ceramic tape, wrapping the tape continuously around the mandrel in a spiral pattern to attain the desired width (tube length) and thickness.

The green ceramic tube is then laminated in a pressure laminator, preferably a hydrostatic laminator where high pressure water from, most normally, 3000 to 5000 psi is applied so as to forcibly adhere the organic binder of each ceramic layer to the next. Pressure lamination (i) links the polymer chains between each ceramic layer, (ii) cross-links the polymer chains within each ceramic layer, and, importantly, (iii) fully densifies the ceramic laminate structure by removing tiny air bubbles.

A challenge with this "laid up", or "lamination", approach is that a laminated tube will tend to stick to the mandrel after the lamination process. To solve this problem, a coating may be applied on the mandrel, such as a wax coating. The mandrel may be prepared for the tube-making operation by dipping the mandrel into hot wax (or rubbing a cold wax stick onto a heated mandrel), and then letting the wax cool. The coated mandrel, with its solidified coating, becomes the core of the green ceramic tube. After lamination, the green ceramic tube is stuck to the mandrel, but can be removed by heating the mandrel above the melting point of the wax. Even a thin coating of wax will become liquid and will then permit the tube to be removed easily. A variation of this process would be to make the mandrel completely out of wax, but that can have the disadvantage of making it difficult to maintain tube straightness. Other materials can prospectively be used to accomplish the wax coating on the mandrel, including an ice/water combination, but are not believed to be as convenient as wax.

The advantages of the method of the present invention are numerous: a ceramic tube made of thin cast tape layers will have a maximum defect size equal to the thickness of the tape, meaning that thin walled tubes can be made with very high quality. The preferred lamination process using a preferred polyvinyl butyryl binder (PVB) produces a tube of high rigidity because the high lamination pressures (i) cross links the tape, (ii) links polymer chains between lamination layers, and (iii) removes air bubbles (reduces porosity) compared to the characteristics of a soft and un-laminated PVB tape. The green ceramic tube, once removed from the mandrel, will not sag during bakeout and can even be fired on a flat surface.

Further in accordance with the method of the present invention, it is easy to create usefully different thicknesses along the length of the tube. This is particularly useful in providing increased thickness, and strength, to the ends of a very thin tube, at which ends the tube is held for mounting. For example, a tube of desirably thin 50 $\mu$m average wall thickness might prove to be very fragile for normal mounting in a solid oxide fuel cell. However, if additional tape is wrapped at the ends of the tube, say in the last 1 centimeter at each end so as to there increase the wall thickness to several hundred microns, then the tube may be held and mounted with increased reliability, and with increased resistance to breakage. Thickening of the tube ends generally serves to make ever-thinner-walled tubes mechanically practical.

A variation on this concept of selective reinforcement of the thin-wall tube is to wrap additional material down the length of the tube, and in selected areas, as a strength-enhancing and stress-absorbing binding in order to improve the burst and/or break strength of the tube (without gross effect on oxygen migration through remaining thin-walled regions of the tube). For example, a strip of green ceramic material of many tens of centimeters length can be produced from green tape that has a 50 $\mu$m×50 $\mu$m section. This strip can be wrapped around the tube like as the hoops of a barrel or, preferably, in a spiral or helix. If desired, yet another piece can be wrapped around the tube, normally in a spiral or helix of opposite handedness. These top wrap(s) give added strength to the final, fired tube.

Still yet another feature of the ceramic tube manufacturing method of the present invention is that a varied internal form can quite readily be imparted to the tube, particularly so as to create turbulence within the tube. The method of constructing thin-walled ceramic tubes with complex internal features preferably starts with a solid mandrel that has been machined or otherwise shaped so as to create a channel down the length of the mandrel, preferably a spiral channel for all or most of the length of the tube which will be formed upon the mandrel. After the mandrel is coated with wax, a ceramic green tape is wound around the mandrel and laminated. After lamination, the tube is heated and then removed from the mandrel (and vice versa). If the mandrel's channel is a spiral (or helical) channel, then the tube may be turned in the manner of a nut on a threaded screw as it is backed off the mandrel. At least the inner layers of the tape wrap will penetrate into the spiral channel of the mandrel, giving a three-dimensional form inside the tube which will serve as a partial baffle to the flow of gases longitudinally through the tube, desirably increasing turbulence in this gas flow.

The net advantage of these further improvements is to give improved strength and toughness to the thinnest of ceramic tubes, thus making possible high-efficiency, reliable and strong thin-wall ceramic tubes eminently suitable for use in a solid oxide fuel cell (SOFC). Meanwhile, automated manufacturability of the tube is retained, and tubes of usefully complex contours both external and internal may be readily and inexpensively made.

In particular, the optionally thicker tube ends permit even very thin tubes to be better and more reliably mounted into the larger mating pieces. Integral wraps or windings down the exterior length of the tube give better mechanical strength to the tube itself, while maintaining the thin walls of the tube over most of its area. Finally, features created in the interior of the tube induce turbulence in the gas flow longitudinally within the tube.

1. A Method of Making a Ceramic Tube

Accordingly, in one of its aspects, the present invention is embodied in a method of making a ceramic tube of wall thickness $T_{tube}$.

The method consists of (i) wrapping green ceramic, having a thickness $T_{wrap}$ that is thinner than the thickness $T_{tube}$ of the tube, around a mandrel a multiple n times, (ii) laminating together the n wraps of the green ceramic under pressure while still wrapped about the mandrel; and then, in either sequence, both (iii) separating the mandrel from the laminated wraps, and (iv) sintering the separated laminated wraps to produce a laminated ceramic tube of wall thickness $n \times T_{wrap} = T_{tube}$.

The wrapping may provide a cumulative wall thickness $T_{tube}$ that is less than 1 millimeter, for example less than 100 micrometers. Ergo the method serves to make a thin-walled ceramic tube.

The wrapped green ceramic may be ceramic tape, which may be wound around the mandrel in a spiral pattern. This green ceramic tape may be wound around the mandrel in spirals of complimentary right-hand, and left-hand, twist, one wound layer to the next.

The wrapped green ceramic tape may have a width $W_{tape}$ less than 0.20 the length $T_{length}$ of the ceramic tube that is made from laminated layers of the tape. The tape is therefor wound about the mandrel at least 1/0.2=5 times so as to form each single thickness, tube end to tube end, of each wound layer.

Likewise, the wrapped green ceramic tape is preferably of a thickness $T_{wrap}=T_{tape}$ less than 0.20 the thickness $T_{tube}$ of the ceramic tube that is made from laminated layers of the tape. The resulting ceramic tube of n layers thus has at least 1/0.2=5 laminate layers.

The green ceramic may alternatively be ceramic sheet, which ceramic sheet is preferably wound radially around the mandrel in equal area sheets with each sheet substantially aligned with and continued from an earlier sheet.

In this case the wrapped green ceramic sheet is preferably of a width $W_{sheet}$ equal to a length $T_{length}$ of the ceramic tube made from laminated layers of the tape. Each sheet is therefor wound straight around the mandrel to form a single thickness of each wrap.

Likewise in this case, the wrapped green ceramic sheet is preferably of a thickness $T_{sheet}$ less than 0.20 the thickness $T_{tube}$ of the ceramic tube made from laminated layers of the sheet. The resulting ceramic tube of n layers thus again has at least 1/0.2=5 laminate layers.

The basic method may, after the wrapping but before the laminating, optionally further include a further wrapping upon the laminate layers of the tube of at least one extra winding. This extra winding is coextensive with the body of the tube as would be a wrap layer, but is rather wrapped around the tube in the manner of a rope binding, thereby to add structural strength to the tube.

This optional further wrapping may in particular be of plural spiral or helical windings of ceramic tape in complimentary left-hand and right-hand spirals. This optional further wrapping may also be at end regions of the tube only, and not at the central region of the tube. When the end region(s) is (are) thickly wrapped, then the central region of the tube is thinner, being of thickness $T_{tube}$, then is (are) this (these) end area(s) of the tube where exist(s) additional thickness of the ceramic tape.

These optionally thickened tube end regions may be derived from 1) wraps having greater thickness $T_{wrap}$ as are selectively applied to end regions of the tube, or else from 2) wraps of substantially equal thickness $T_{wrap}$ are applied to a greater number of layers n at end regions of the tube, or from both wraps types 1) and 2), so that the wrapped laminated tube is not of equal thickness, but is thicker at end regions.

The tube may optionally have internal features, or baffles. Namely, the method may be performed using a mandrel having one or more grooves, or channels. The grooves may be circumferential, but are preferably in spiral, or helical, form. The wrapping is then of successive wraps at least the interior ones of which wraps pull tight into the spiral groove(s) of the mandrel, producing after the sintering a laminate ceramic tube having a interior bore in which is present one or more grooves in the manner of the rifling of a rifle barrel. As a variation, the mandrel, and the resulting tube, may spiral grooves that are (i) intertwined, being both of a right-hand or both of a left hand type, or that are (ii) intersecting, being of both right- and left-hand types.

The green ceramic preferably contains a cross-linkable organic binder. The laminating together under pressure then consists of laminating in a hydrostatic pressure laminator. The pressure of the laminator and the laminating is sufficient to cross-link the organic binder within the ceramic of each layer, forming linked polymer molecular chains between layers.

In an exemplary method, a releasing agent, preferably wax, is placed on the surface of the mandrel before the applying of the green ceramic tape wrap. The separating of the mandrel from the laminated wrapped tape then consists of activating the releasing agent on the surface of the mandrel (such as by heating the wax until it melts), and withdrawing the mandrel from the laminated wrapped layers of ceramic.

In an alternative embodiment, before wrapping the green ceramic material around the mandrel, a sacrificial organic material, also of sheet or tape form, is wrapped around the mandrel to a desired thickness. The organic material may also be wrapped around the mandrel over the green ceramic wraps. The organic material layers build up the green material thickness to lessen the delicateness of the thin-wall ceramic when removed from the mandrel, particularly when removed from the mandrel prior to sintering. During sintering, the organic material burns off, thus leaving only the ceramic tube. The organic material may be similar to the green ceramic tape, but does not contain the ceramic particles. For example, the organic material may include a vinyl or acrylic polymer and a plasticizer, such that it is a polymer film. Alternatively, the organic material may be a polymer film matrix with a corn starch particulate filler, which filler adds better handling properties to the organic material such that is behaves similarly to the green ceramic material. As described above, a releasing agent may also be placed on the surface of the mandrel before applying the organic material layer.

The invention includes both laminate ceramic tubes, and thin-walled laminate tubes particularly sized, adapted and suitable for use in fuel cells, that are produced by this method.

2. Thin-Walled Laminate Ceramic Tubes with Integral Features

In another of its aspects, the present invention is embodied in laminated thin-walled ceramic tubes having particular, integral, features that are not know by the inventors to have been present in the prior art.

In one embodiment, the thin-walled ceramic tube has at its exterior surface an integral ceramic wrap or winding which serves to strengthen the tube against bursting and breakage while permitting that a majority of the exterior surface of the tube is neither wrapped nor wound, and in these regions the tube maintains its relatively thinner walls. This ceramic wrap or winding is preferably in one or more spirals along the length of the tube, or in a number of intersecting clockwise and counter-clockwise spirals. The external appearance of the tube is thus similar in appearance to the leg windings of a roman sandal, or the intertwined snakes of a caduceus.

In another, complimentary embodiment, the laminated thin-wall ceramic tube has at its ends increased integral thickness of ceramic. This thickness serves to strengthen the tube against end damage during mounting of the tube to any external structure at, and by, the tube's end regions.

In still another, further complimentary embodiment, the laminated thin-wall ceramic tube has at its interior surface an integral feature, or baffle, that serves to induce turbulence in any longitudinal flow of gases within, and along the length of, the tube. This integral interior surface feature is preferably a spiral channel along the length of the tube.

3. A Complete Fuel Cell Reaction Chamber Based on a Thin-Walled Laminate Ceramic Tube In yet another of its aspects, the laminated thin-walled ceramic tubes may be used in combination as a complete reaction chamber of a fuel cell.

In one exemplary method of making a tubular reaction chamber of a fuel cell from concentric ceramic tubes, lengths of thin planar green ceramic, either sheet or tape, are prepared both (i) plain and (ii) with a metallization layer upon one surface.

One or more turns of first thin planar green ceramic having a metallization surface are first wrapped around a mandrel sufficiently contiguously and extensively so as to form an uninterrupted first tubular surface.

Then one or more turns of thin planar plain green ceramic surface are second wrapped around the mandrel over the first thin planar green ceramic. This second wrapping is again sufficiently contiguous and extensive so as to form an uninterrupted tubular surface—a second tubular surface.

Then one or more turns of third thin planar green ceramic having a metallization surface are third wrapped around the mandrel over the second thin planar green ceramic. This third wrapping is also sufficiently contiguous and extensive so as to again form an uninterrupted, third, tubular surface.

The first and the second and the third wrappings of green ceramic as do form the first and the second and the third tubular surfaces are then laminated together under pressure while these wrappings are still wrapped about the mandrel.

Subsequently, the mandrel is separated from the laminated wraps, and the laminated wraps sintered to produce three laminated concentric ceramic tubes each of the tubes is itself laminated.

In the composite structure the innermost first tube—being of the first thin planar ceramic having a metallization surface—is within a next, second, tube—being of the second thin planar plain ceramic—is within a next, third and outermost, tube—being of the third thin planar ceramic having a metallization surface. The metallization of one of the innermost first and the outermost third tube is suitably an anode, while the metallization of the other tube is suitably a cathode of a reaction chamber of a fuel cell. The second tube is suitably the electrolyte of this fuel cell reaction chamber.

Accordingly, a tubular reaction chamber of a fuel cell has been formed from concentric ceramic tubes each of which tubes is laminated, and where the entire tubular reaction chamber is laminated.

The first wrapping is preferably of one or more turns of first thin planar green ceramic having its metallization surface to the exterior, and away from the mandrel, while the third wrapping is preferably of one or more turns of third thin planar green ceramic having its metallization surface to the interior, and towards the mandrel.

In another exemplary embodiment of the present invention, a first electrode material, either in sheet or tape form, is wrapped around the mandrel so as to form a first tubular surface. The first electrode material may be a cathode material or an anode material. The green ceramic material having a thickness $T_{wrap}$ is then wrapped around the mandrel over the first tubular surface a multiple n times so as to form a second tubular surface. A second electrode material is then wrapped around the mandrel over the second tubular surface so as to form yet a third tubular surface. The second material may also be a cathode material or an anode material. Where the first electrode material is suitable for an anode, then the second electrode material is selected to be suitable as a cathode, and vice-versa. The wraps of the first electrode material, the green ceramic material and the second electrode material are then laminated under pressure while still wrapped around the mandrel. After separating the laminated wraps and sintering the laminated wraps, a ceramic tube is produced having an inner first electrode and an outer second electrode, one being an anode and one being a cathode. This ceramic tube is suitably the electrolyte for the fuel cell reaction chamber. The above embodiments with respect to integral features for the ceramic tube portion of the reaction chamber may also be utilized in this embodiment.

The first electrode material or the second electrode material, or both electrode materials, may be a metal. Suitable metals for an anode and cathode, such as for use in a SOFC, are known to those of ordinary skill in the art. Alternatively, one or both electrode materials may be an electronically conductive green ceramic, which are also known to those of ordinary skill in the art. For example, the anode material may be a partially sintered metallic nickel coated with yttria stabilized zirconia, and the cathode material may be a modified lanthanum manganite which has a perovskite structure.

In another embodiment, one or both of the electrode materials may be a composite of a green ceramic and a conductive metal present in an amount sufficient to render the composite conductive. In general, a ceramic matrix becomes electronically conductive when the metal particles start to touch. The amount of metal sufficient to render the composite matrix conductive will vary depending mainly on the metal particle morphology. For example, the amount of metal will generally need to be higher for spherical powder metal than for metal flakes. In an exemplary embodiment, the composite comprises a matrix of the green ceramic with about 40–90% conductive metal particles dispersed therein. The green ceramic matrix may be the same or different than the green ceramic material used for the ceramic tube.

In the embodiments in which one or both electrode materials include a ceramic, i.e., the electronically conductive green ceramic or the composite, the green ceramic in the electrode materials and the green ceramic material for the ceramic tube may contain cross-linkable organic binders, such that during the lamination, the pressure is sufficient to cross-link the organic binder within the wraps as well as to link polymer molecular chains between the wrap layers.

Additional green ceramic material may be wrapped around the mandrel over the second or third tubular surfaces at the end regions of the tube only, and not at the central region of the tube, to provide thicker end regions for the tube, and a thinner central region. A release agent may also be applied on the surface of the mandrel prior to wrapping the first electrode material around the mandrel. In addition, before wrapping the first electrode material around the mandrel, the mandrel may first be wrapped with a sacrificial organic material to a desired thickness. The organic material may also be wrapped over the third tubular surface formed of the second electrode material. The organic material layers build up the green thickness of the laminated wrap, but subsequently burn away during sintering.

The mandrel is used for providing structure to the green materials so as to achieve a thin-wall ceramic tube of high quality. However, in an exemplary embodiment of the present invention, the mandrel may be replaced with a tube formed of a material suitable for use as the anode or cathode of the reaction chamber. The green ceramic material is then wrapped directly onto the first electrode tube, and need not be subsequently removed after lamination and before or after sintering. A second electrode material may be wrapped around the green ceramic in accordance with any of the above embodiments. Alternatively, the second electrode may be printed onto the sintered ceramic tube.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 1B:
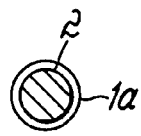
Figure 1C:
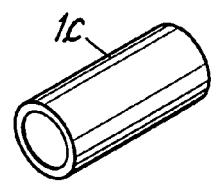

FIG. 1, consisting of FIGS. 1a through 1c, diagrammatically illustrates the principle steps of the preferred method of the present invention for the fabrication of thin-wall laminated ceramic tubes. A green ceramic tape or sheet 1 is shown wrapped about a typically cylindrical mandrel 2 in FIG. 1a.

The step of laminating the wrapped green ceramic 1—previously applied in the step of FIG. 1a—to form a laminated green ceramic wrap 1a is illustrated in FIG. 1b.

Finally, the removing of the mandrel 2 and sintering before or after the removal, leaving a thin-wall laminated ceramic tube 1c, is illustrated in FIG. 1c.

Figure 2A:
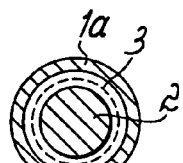
FIG. 2, consisting of FIGS. 2a and 2b, is an end and a side perspective view of mandrel to which a releasing agent, normally wax, has been applied in accordance with one embodiment of the thin-wall laminated ceramic tube fabrication method of the present invention.
Figure 2B:
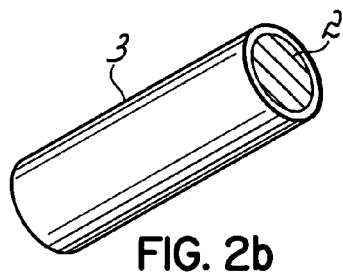

Removal of the mandrel 2 is optionally aided by a releasing agent that is applied even before the wrapping step of FIG. 1a. This is illustrated in FIG. 2, where FIG. 2b shows a mandrel 2 covered with a releasing agent 3; normally wax applied by coating or dipping when hot followed by a subsequent cooling. FIG. 2a—which is similar to FIG. 1b—shows the laminated green ceramic wrap 1a, about a mandrel 2 having a releasing agent 3 upon its surface.

An end view and a side perspective view of mandrel 2 to which a releasing agent 3, normally wax, has been applied are respectively shown in FIGS. 2a and 2b. Application of the releasing agent 3 is optional, but advantageous, in the thin-wall laminated ceramic tube fabrication method of the present invention.

Figure 3A:
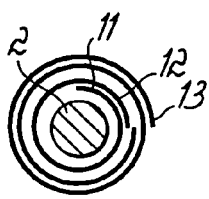
FIG. 3, consisting of FIGS. 3a through 3c, is an end, a side perspective, and an end view of an extension of the method of the present invention to produce a fuel cell reaction chamber having both anodes and cathodes with an electrolyte between them.
Figure 3B:
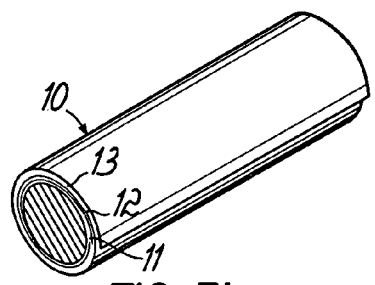
Figure 3C:
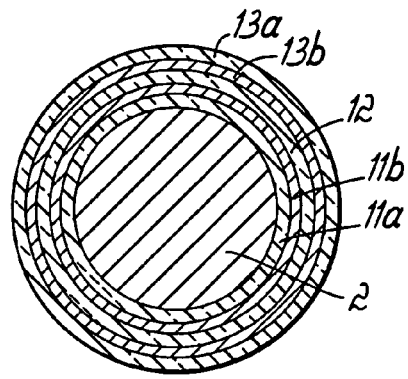

FIG. 3, consisting of FIGS. 3a through 3c, shows an end view, a side perspective view, and another end view, respectively, of an extension of the method of the present invention to produce a fuel cell reaction chamber having both anodes and cathodes with an electrolyte between them. The wrapping of the mandrel 2 with each of a first, second and third ceramic wrap (each of which wraps may itself consist of plural wrappings) is illustrated in FIG. 3a. The completed fuel cell rod 10 with cathode 11, electrolyte 12 and anode 13 is shown in FIG. 3b.

All the wraps, which become the functional layers of cathode 11, electrolyte 12 and anode 13, are sufficiently contiguous and extensive so as to first form uninterrupted tubular surfaces and then, after sintering, uninterrupted tubes. Although each tubular cathode 11, electrolyte 12 and anode 13 is itself integral and whole, it is not necessary that each tube be gas tight to the next and, indeed, there may even be slight longitudinal cavities between the tubes as support the longitudinal flow of gases. Only the green ceramic, and ultimately the tubular cathode 11 and tubular anode 13, are possessed of a metallization layer. Normally, and as best shown in FIG. 3c, the metallization layer 11b on the green ceramic 11a forming the tubular cathode 11 is disposed outwardly, and away from the mandrel 2—although this is not essential. The metallization layer 13b on the green ceramic 13a forming the tubular cathode 13 is likewise preferably disposed inwardly, and towards the mandrel 2—although this also is not essential. The green ceramic forming the tubular electrolyte 12 is entirely ceramic. The tubular electrolyte 12 is porous to the penetration of gases, namely oxygen, and is thus properly called an electrolyte. In operation, the tubular fuel cell reaction chamber of FIG. 3 formed from laminated tubes receives fuel and oxygen-containing air, and functions to catalyze a reaction between the fuel and the air.

Figure 4:
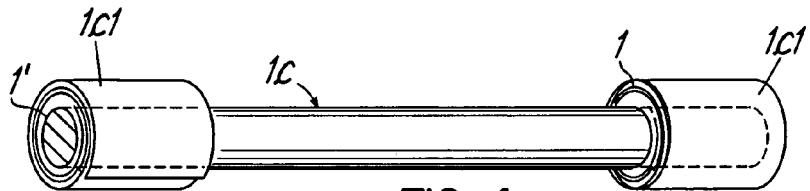
FIG. 4 is a diagrammatic perspective view of a variant embodiment of a thin-wall laminated ceramic tube in accordance with the present invention having thickened end regions.

A diagrammatic perspective view of a variant embodiment of a thin-wall laminated ceramic tube 1c in accordance with the present invention is shown in FIG. 4. The tube 1c has one or two thickened end regions 1c1 that are formed either from (i) wrappings of ceramic sheet or tape 1' that are, at this (these) region(s) (only) of increased thickness, or, from (ii) additional wrappings of ceramic sheet or tape 1 (exclusively) in the end regions of the tube 1c. The thickened end regions 1c1 make the tube less susceptible to end damage, and to breaking, during mounting at its ends.

Figure 5A:
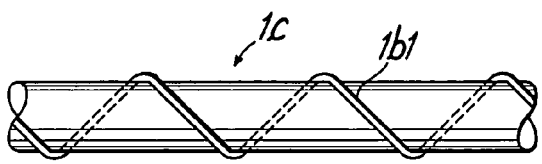
FIG. 5, consisting of FIGS. 5a and 5b, is a diagrammatic perspective view of variant embodiments of a thin-wall laminated ceramic tube in accordance with the present invention respectively having single and double, spiral or helical, external wrappings or windings.
Figure 5B:
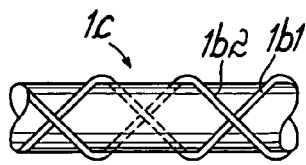

A diagrammatic perspective view of a variant embodiment of a thin-wall laminated ceramic tube 1c, in accordance with the present invention having single spiral or helical, external wrapping or winding 1b1 is shown in FIG. 5a. The variant embodiment of the thin-wall laminated ceramic tube 1c in accordance with the present invention having double, opposite-handedness, spiral or helical, external wrappings or windings 1b1, 1b2 is shown in FIG. 5b.

Figure 6:
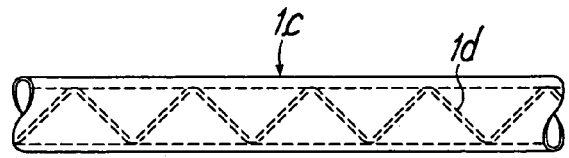
FIG. 6 is a diagrammatic perspective view of a variant embodiment of a thin-wall laminated ceramic tube in accordance with the present invention having an internal spiral or helical groove in the manner of the rifling of a rifle barrel.

A diagrammatic perspective view of a variant embodiment of a thin-wall laminated ceramic tube 1c in accordance with the present invention having an internal spiral, or helical, groove 1d (in the manner of the rifling of a rifle barrel) is shown in FIG. 6.

Figure 7A:
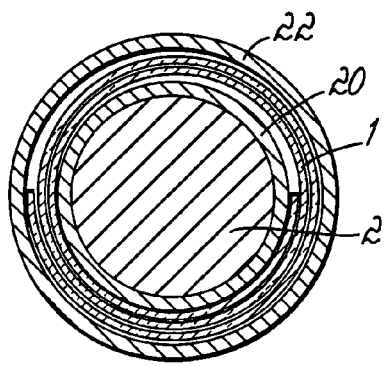
FIG. 7, consisting of FIGS. 7a and 7b, is an end view of an extension of the method of the present invention to produce a fuel cell reaction chamber having both an anode and a cathode with a thin-wall laminated ceramic tube electrolyte therebetween.
Figure 7B:
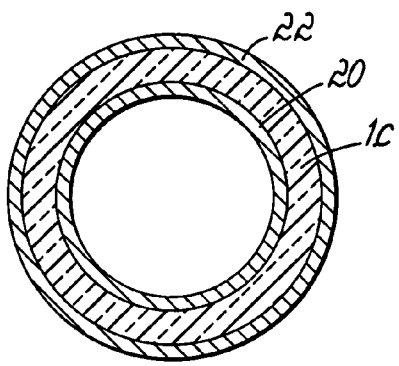

FIG. 7, consisting of FIGS. 7a and 7b, shows an end view of an extension of the method of the present invention to produce a fuel cell reaction chamber having both an anode and a cathode with a ceramic electrolyte therebetween. As shown in FIG. 7a, a first electrode material 20, either an anode material or a cathode material, is wrapped around a mandrel 2, thereby forming a first tubular surface. Green ceramic material 1, in sheet or tape form, is then wound around the mandrel 2 over the first tubular surface formed by the first electrode material 20. The green ceramic material 1 is wrapped around a multiple n times, as in previous embodiments, and forms a second tubular surface. Finally, a second electrode material 22, either an anode or a cathode, is wrapped around the mandrel 2 over the second tubular surface formed by the multiple n wraps of green ceramic material 1. This configuration of wrapped layers is then laminated under pressure, as described above, removed from the mandrel and sintered, in either sequence, to produce the structure depicted in FIG. 7b. The resulting structure is a thin-wall laminated ceramic tube 1c having an inner electrode 20 and an outer electrode 22, such that the structure is suitable for use as a tubular reaction chamber for a fuel cell, such as a SOFC.

Figure 8:
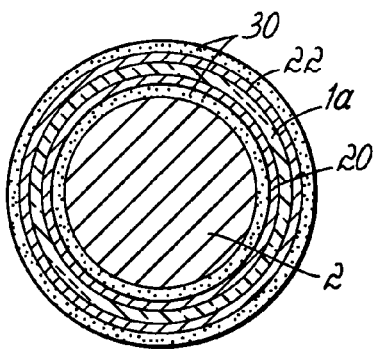
FIG. 8 is an end view of an extension of the method of the present invention using sacrificial organic layers to provide mechanical strength during fabrication of a fuel cell reaction chamber.

FIG. 8 depicts a variation on the method described in FIG. 7. Prior to wrapping the first electrode material 20 onto the mandrel 2, a sacrificial organic material 30 is wrapped around the mandrel 2. First electrode material 20 is then wrapped over the organic material 30, followed by green ceramic material 1, which after lamination produces a laminated green ceramic wrap 1a. The second electrode material 22 is wrapped over the green ceramic material 1. In a further alternative embodiment, a second or additional organic material 30 may be wrapped around the second electrode material 22. After removal from the mandrel 2 and sintering, the structure will be identical to that depicted in FIG. 7b.

Figure 9A:
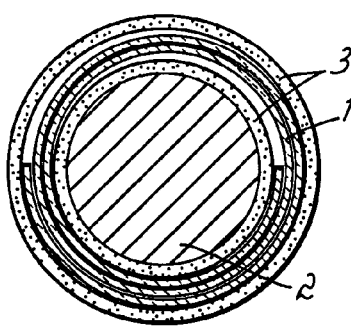
FIG. 9, consisting of FIGS. 9a and 9b, is an end view of an extension of the method of the present invention using sacrificial organic material layers to produce a thin-wall laminated ceramic tube.
Figure 9B:
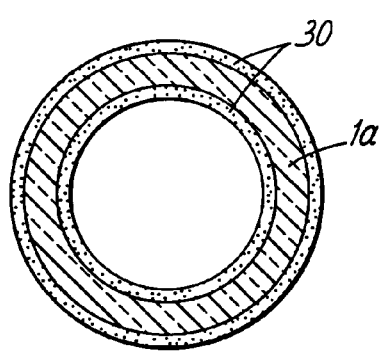

FIG. 9, consisting of FIGS. 9a and 9b, shows an end view of another embodiment of the present invention similar to that depicted in FIG. 8, but without formation of the electrodes. Rather, the use of the sacrificial organic material layers 30 are useful in the fabrication of a thin-wall laminated ceramic tube 1c by building up the green material thickness to facilitate removal of the thin-wall green ceramic 1a from the mandrel 2. As depicted in FIG. 9a, the sacrificial organic material 30 is wrapped around the mandrel 2, and green ceramic material 1 is wrapped a multiple n times around the mandrel 2 over the sacrificial organic material 30.

Optionally, additional organic material 30 may be wrapped around the green ceramic material 1. This wrapped structure is then laminated and removed from the mandrel 2, as shown in FIG. 9b, such that a laminated green ceramic wrap 1a is sandwiched between organic material layers 30. After sintering, a thin-wall laminated ceramic tube 1c is formed, as shown in FIG. 1c.

Figure 10A:
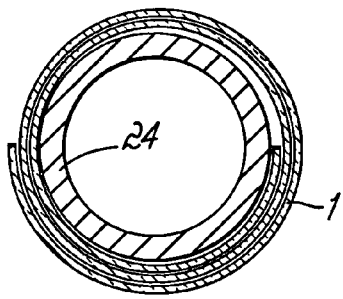
FIG. 10, consisting of FIGS. 10a through 10c, is an end view of an extension of the method of the present invention to produce a fuel cell reaction chamber without the use of a mandrel.
Figure 10B:
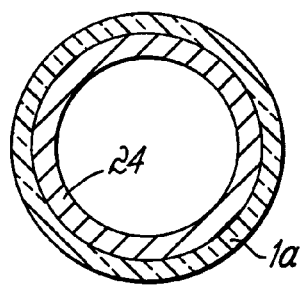
Figure 10C:
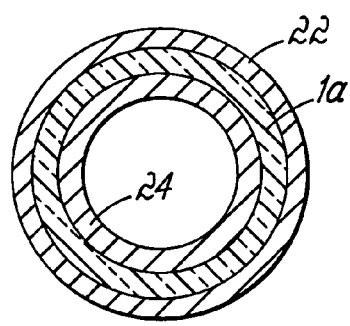

FIG. 10, consisting of FIGS. 10a through 10c, shows an end view of an exemplary embodiment of the present invention that eliminates the use of the mandrel 2, and consequently eliminates the need for separating the laminated wraps from the mandrel 2. As shown in FIG. 10a, which is similar to FIG. 1a, an electrode tube 24 is provided in place of the mandrel 2. The electrode tube has a solid form, and may be suitable for use as either an anode or a cathode in a reaction chamber of a fuel cell. The green ceramic material 1 is wrapped a multiple n times around the electrode tube 24. In FIG. 10b, a laminated green ceramic wrap 1a is shown on the electrode tube 24. In FIG. 10c, a second electrode material 22 is applied over the laminated green ceramic wrap 1a. This structure may then be sintered to produce the same structure depicted in FIG. 7b. Alternatively, the second electrode material 22 may be applied to the green ceramic material 1 in FIG. 10a, prior to laminating. In yet another alternative, the structure in FIG. 10b may be sintered, and a second electrode may be printed or otherwise applied to the thin-wall laminated ceramic tube 1c.

In accordance with the preceding explanation, variations and adaptations of the process for making thin-walled ceramic tubes in accordance with the present invention will suggest themselves to a practitioner of the ceramic arts. For example, the green ceramic could be wrapped about an inflatable or expandable mandrel which is withdrawn by deflating or collapsing the mandrel. In another example, the mandrel could incorporate an electrical heating element so as to sinter the ceramic with which it is wound without benefit of an oven. In yet another example, the ceramic tubes could be used for other purposes than fuel cells. Provided with periodic holes in the manner of a garden sprinkler hose, sealed tubes containing medicine could be used for the infusion of the contained medication into the bodies and/or blood streams of animals into which the tubes were placed. In still another example, mounting tabs, flanges, and other features can be quite easily provided.

In accordance with these and other possible variations and adaptations of the present invention, the scope of the invention should be determined in accordance with the following claims, only, and not solely in accordance with that embodiment within which the invention has been taught.

What is claimed is:

1. A method of making a ceramic tube of wall thickness $T_{tube}$ with electrodes thereon suitable as a tubular reaction chamber for a fuel cell, the method comprising:
    wrapping a first electrode material round a mandrel so as to form a first tubular surface;
    wrapping a green ceramic material, having a thickness $T_{wrap}$ that is thinner than the thickness $T_{tube}$ of the ceramic tube, around the mandrel over the first tubular surface a multiple n times so as to form a second tubular surface;
    wrapping a second electrode material around the mandrel over the second tubular surface so as to form a third tubular surface, wherein the fast electrode material, the green ceramic material and the second electrode material are each selected from sheet material or tape material;
    laminating together the wrap of the first electrode material, the n wraps of the green ceramic material and the wrap of the second electrode material under pressure while still wrapped about the mandrel; and, in either sequence, both
    separating the mandrel from the laminated wraps or the ceramic tube; and
    sintering the laminated wraps to produce a laminated ceramic tube of wall thickness $n \times T_{wrap} = T_{tube}$ having an inner first electrode and an outer second electrode.

2. The method according to claim 1 wherein the wrapping of the green ceramic material is to a cumulative wall thickness $T_{tube}$ less than 1 millimeter.

3. The method according to claim 2 wherein the wrapping of the green ceramic material is to a cumulative wall thickness $T_{tube}$ less than 100 micrometers.

4. The method according to claim 1 wherein the wrapped green ceramic material is tape material, and is wound around the mandrel in a spiral pattern.

5. The method according to claim 4 wherein the wrapped green ceramic tape material is wound around the mandrel in spirals of complimentary right-hand and left-hand twist one wound layer to the next.

6. The method according to claim 1 wherein at least one of the first electrode material or the second electrode material is metal.

7. The method according to claim 1 wherein at least one of the first electrode material or the second electrode material is an electronically conductive green ceramic.

8. The method according to claim 7 wherein the green ceramic material and the electronically conductive green ceramic contain a cross-linkable organic binder, and wherein the laminating together under pressure comprises laminating in a hydrostatic pressure laminator at a pressure sufficient to cross-link the organic binder within the wraps and form linked polymer molecular chains between wraps.

9. The method according to claim 1 wherein at least one of the first electrode material or the second electrode material is a composite of a green ceramic and a conductive metal in an amount sufficient to render the composite conductive.

10. The method according to claim 9 wherein the composite comprises a matrix of the green ceramic, and particles of the conductive metal are dispersed in the matrix, and wherein the conductive metal particles comprise about 40–90% of the composite.

11. The method according to claim 9 wherein the green ceramic material and the composite of the green ceramic contain a cross-linkable organic binder, and wherein the laminating together under pressure comprises laminating in a hydrostatic pressure laminator at a pressure sufficient to cross-link the organic binder within the wraps and form linked polymer molecular chains between wraps.

12. The method according to claim 1 wherein the green ceramic material is sheet material, and is wound radially around the mandrel.

13. The method according to claim 1 further comprising:
    further wrapping green ceramic material around the mandrel over at least one of the second or the third tubular surface at end regions of the tube only, and not at a central region of the tube;
    wherein the central region of the tube is thinner, being of thickness $T_{tube}$ then are the end regions of the tube where exist the further wraps of the ceramic material.

14. The method according to claim 1 that, before the wrapping, further comprises:
placing a releasing agent on the surface of the mandrel; and wherein the separating of the mandrel from the laminated wraps comprises:
activating the releasing agent on the surface of the mandrel; and
withdrawing the mandrel from the laminated wraps.

15. The method according to claim 14 wherein the placing of the releasing agent on the surface of the mandrel comprises applying Wax to the surface of the mandrel, and wherein the activating of the releasing agent comprises melting the wax.

16. The method according to claim 1 further comprising, before wrapping the first electrode material, wrapping a sacrificial organic material around the mandrel to a desired thickness, wherein the organic material is selected front sheet material or tape material, and wherein the organic material is burned away during the sintering.

17. The method according to claim 16 further comprising, before laminating, wrapping an additional sacrificial organic material over the third tubular surface to a desired additional thickness, wherein the additional organic material is selected from sheet material or tape material, and wherein the additional organic material is burned away during the sintering.

18. A method of making a ceramic tube of wall thickness $T_{tube}$ with electrodes thereon suitable as a tubular reaction chamber for a fuel cell, the method comprising:
providing a first electrode tube in solid form and of sufficient structural integrity to serve as a supporting structure;
wrapping a green ceramic material, having a thickness $T_{wrap}$ that is thinner than the thickness $T_{tube}$ of the ceramic tube, around the first electrode tube a multiple n times, wherein the green ceramic material is selected from sheet material or tape material;
laminating together the n wraps of the green ceramic material under pressure while wrapped about the first electrode tube;
sintering the laminated wraps to produce a laminated ceramic tube of wall thickness $n \times T_{wrap} = T_{tube}$ and an inner first electrode comprising the first electrode tube, wherein the first electrode tube serves as the supporting structure for the green ceramic material during wrapping, laminating and sintering and serves as the inner first electrode in the tubular reaction chamber; and
providing an outer second electrode by one of the following:
a) before laminating, wrapping a second electrode material around the n wraps of the green ceramic material, wherein the second electrode material is selected from sheet material or tape material, and laminating the second electrode material together with laminating the n wraps of the green ceramic material;
b) before sintering, wrapping a second electrode material around the laminated wraps, wherein the second electrode material is selected from sheet material or tape material; and
c) after sintering, printing a second electrode material onto the ceramic tube.

19. The method according to claim 18 wherein the wrapping of the green ceramic material is to a cumulative wall thickness $T_{tube}$ less than 1 millimeter.

20. The method according to claim 19 wherein the wrapping of the green ceramic material is to a cumulative wall thickness $T_{tube}$ less than 100 micrometers.

21. The method according to claim 18 wherein the wrapped green ceramic material is tape material, and is wound round the first electrode tube in a spiral pattern.

22. The method according to claim 21 wherein the wrapped green ceramic tape material is wound around the first electrode tube in spirals of complimentary right-hand and left-hand twist one wound layer to the next.

23. The method according to claim 18 wherein the second electrode material is metal.

24. The method according to claim 18 wherein the outer second electrode is provided by one of a) or b), and the second electrode material is an electronically conductive green ceramic.

25. The method according to claim 24 wherein the outer second electrode is provided by a) and the green ceramic material and the electronically conductive green ceramic contain a cross-linkable organic binder, and wherein the laminating together under pressure comprises laminating in a hydrostatic pressure laminator at a pressure sufficient to cross-link the organic binder within the wraps and form linked polymer molecular chains between wraps.

26. The method according to claim 18 wherein the outer second electrode is provided by one of a) or b), and the second electrode material is a composite of a green ceramic and a conductive metal in an amount sufficient to render the composite conductive.

27. The method according to claim 26 wherein the composite comprises a matrix of the green ceramic, and particles of the conductive metal are dispersed in the matrix, and wherein the conductive metal particles comprise about 40–90% of the composite.

28. The method according to claim 26 wherein the outer second electrode is provided by a) and the green ceramic material and the composite of the green ceramic contain a cross-linkable organic binder, and wherein the laminating together under pressure comprises laminating in a hydrostatic pressure laminator at a pressure sufficient to cross-link the organic binder within the wraps and form linked polymer molecular chains between wraps.

29. The method according to claim 18 wherein the green ceramic material is sheet material, and is wound radially around the first electrode tube.

30. The method according to claim 18 further comprising;
further wrapping green ceramic material around the first electrode tube at end regions of the first electrode tube only, and not at a central region of the first electrode tube;
wherein the central region of the laminated ceramic tube is thinner, being of thickness $T_{tube}$, then are the end regions of the laminated ceramic tube where exist the further wraps of the ceramic material.

* * * * *